(12) United States Patent
Noh et al.

(10) Patent No.: US 9,673,879 B2
(45) Date of Patent: *Jun. 6, 2017

(54) METHOD AND APPARATUS FOR OPERATING A POWER SAVE MODE IN A WIRELESS LAN SYSTEM

(71) Applicant: LG ELECTRONICS INC., Seoul (KR)

(72) Inventors: Yu Jin Noh, Anyang-si (KR); Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

This patent is subject to a terminal disclaimer.

(21) Appl. No.: 14/883,887

(22) Filed: Oct. 15, 2015

(65) Prior Publication Data
US 2016/0036503 A1 Feb. 4, 2016

Related U.S. Application Data

(63) Continuation of application No. 13/700,123, filed as application No. PCT/KR2011/003842 on May 25, 2011, now Pat. No. 9,191,893.
(Continued)

(51) Int. Cl.
*H04B 7/04* (2006.01)
*H04W 52/02* (2009.01)
(Continued)

(52) U.S. Cl.
CPC .......... *H04B 7/0452* (2013.01); *H04W 4/08* (2013.01); *H04W 52/0216* (2013.01);
(Continued)

(58) Field of Classification Search
CPC .......... H04W 84/12; H04W 52/0216; H04W 52/0235; H04W 4/08; H04W 72/044;
(Continued)

(56) References Cited

U.S. PATENT DOCUMENTS 7,796,545 B2    9/2010 Surineni et al.
2007/0115972 A1    5/2007 Jang et al.
(Continued)

FOREIGN PATENT DOCUMENTS

KR    1020070042442    4/2007

*Primary Examiner* — Noel Beharry
*Assistant Examiner* — Nicole King
(74) *Attorney, Agent, or Firm* — Lee Hong Degerman Kang Waimey

(57) ABSTRACT

A communication method that includes transmitting a power save multi-poll (PSMP) frame containing a power save mode (PSM) of a non-access point (AP) station (STA) to a first station and to a second station which are paired with an AP on the basis of multiple input multiple output (MIMO) technology. Information on the PSM indicates the point in time of starting a downlink transmission period, the duration of the downlink transmission period, and transmission object station identification information. The method further involves transmitting a data frame to the first station and to the second station on the basis of the MIMO technology during the downlink transmission period. The transmission object station identification information indicates a group identifier for indicating an object station group including the first station and the second station.

8 Claims, 11 Drawing Sheets

Related U.S. Application Data

(60) Provisional application No. 61/348,253, filed on May 26, 2010.

(51) Int. Cl.
 *H04W 4/08* (2009.01)
 *H04W 72/04* (2009.01)
 *H04W 84/12* (2009.01)
 *H04B 7/0452* (2017.01)

(52) U.S. Cl.
 CPC ..... *H04W 52/0235* (2013.01); *H04W 72/044* (2013.01); *H04W 84/12* (2013.01); *Y02B 60/50* (2013.01)

(58) Field of Classification Search
 CPC . H04W 72/042; H04W 72/121; H04W 72/04; H04W 72/1289; H04B 7/0452; Y02B 60/50
 See application file for complete search history.

(56) References Cited

U.S. PATENT DOCUMENTS

| | | |
|---|---|---|
| 2007/0147284 A1 | 6/2007 | Sammour et al. |
| 2007/0147423 A1 | 6/2007 | Wentink |
| 2007/0171858 A1 | 7/2007 | Grandhi et al. |
| 2007/0189207 A1 | 8/2007 | Sammour et al. |
| 2007/0201467 A1 | 8/2007 | Kakani |
| 2007/0201468 A1 | 8/2007 | Jokela |
| 2010/0046457 A1 | 2/2010 | Abraham et al. |
| 2011/0096796 A1 | 4/2011 | Zhang et al. |
| 2011/0141892 A1 | 6/2011 | Gong et al. |
| 2011/0149731 A1 | 6/2011 | Gong et al. |

METHOD AND APPARATUS FOR OPERATING A POWER SAVE MODE IN A WIRELESS LAN SYSTEM

CROSS-REFERENCE TO RELATED APPLICATIONS

This application is a continuation of U.S. patent application Ser. No. 13/700,123, filed on Nov. 26, 2012, now U.S. Pat. No. 9,191,893, which is the National Stage filing under 35 U.S.C. 371 of International Application No. PCT/KR2011/003842, filed on May 25, 2011, which claims the benefit of U.S. Provisional Application No. 61/348,253, filed on May 26, 2010, the contents of which are all hereby incorporated by reference herein in their entirety.

TECHNICAL FIELD

The present invention relates to a wireless local area network (WLAN) system, and more particularly, to a method for a power save mode operation performed by an access point in the WLAN system, and an apparatus supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate. The power save mode is supported for power saving of an STA which does not require the active state to receive the frame. An STA supporting the power save mode (PSM) can avoid unnecessary power consumption by operating in a doze mode when it is not a time duration in which the STA can access to its radio medium. That is, the STA operates in the awake state only for a time duration in which a frame can be transmitted to the STA or a time duration in which the STA can transmit the frame. For this, an access point (AP) composing a Basic Service Set (BSS) provides non-AP STAs associated with the AP and/or which located in a BSS service area (BSA) with information about a PSM operation. Therefore, STAs supporting the PSM can transmit and receive frame by switching an operation mode between a sleep mode and an awake mode based on the corresponding information.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

A next-generation WLAN system supporting supports a Multi User-Multiple Input Multiple Output (MU-MIMO) transmission which a plurality of STAs simultaneously access a channel for efficiently using a wireless channel. By using the MU-MIMO transmission, an AP can simultaneously transmit frames to one or more non-AP STA which is MIMO pared to the AP.

Meanwhile, although the AP provides information for operating the PSM mode to the non-AP STA in the conventional WLAN system, an aspect to be considered for MU-MIMO has not been adopted. Therefore, there is a need to discuss on a method for supporting a PSM mode operation of one or more non-AP STAs in a next-generation WLAN system supporting MU-MIMO transmission.

SUMMARY OF INVENTION

Technical Problem

The present invention provides a method and apparatus for operating a power save mode in a next generation wireless local area network (WLAN) system supporting multi user-multiple input multiple output (MU-MIMO) transmission.

Technical Solution

In an aspect, a method for operating a power save mode (PSM) in a wireless local area network (WLAN) system is provided. The method includes transmitting a power save multi-poll (PSMP) frame containing PSM information of a non-access point (AP) station (STA) to a first STA and a second STA which are multiple input multiple output (MIMO)-paired with an AP, the PSM information including a downlink transmission start offset indicating a time point at which a downlink transmission period starts, a downlink transmission duration indicating a duration of the downlink transmission period, and transmission destination STA identification information, and transmitting a data frame to the first STA and the second STA by using MIMO transmission during the downlink transmission period. The transmission destination STA identification information indicates a group identifier (ID) for indicating a destination STA group including the first STA and the second STA which are destinations of MIMO transmission performed by the AP.

The PSM information may further include uplink transmission start offset information indicating a time point at which the first STA can access radio media to transmit the data frame to the AP and first uplink transmission duration information indicating a duration in which the first STA can access the radio media from the time point.

The method may further include transitioning the first STA and the second STA to an awake mode at a time point indicated by the downlink transmission start offset information.

The method may further include operating the second STA in a sleep mode during a period indicated by the first uplink transmission duration information.

The method may further include transmitting a first data frame from the first STA to the AP during a period indicated by the first uplink transmission duration information.

Information for the PSM operation may further include second uplink transmission duration information for indicating a period in which the second STA can access radio media to transmit the data frame to the AP.

The method may further include operating the first STA to transition to a sleep mode during a period indicated by the second uplink transmission duration information.

The method may further include transmitting a second data frame from the second STA to the AP during the period indicated by the second uplink transmission duration information.

In another aspect, a wireless apparatus includes a transceiver for transmitting and receiving a radio signal, and a processor operatively coupled to the transceiver. The processor is configured for transmitting a power save multi-poll (PSMP) frame containing PSM information of a non-access point (AP) station (STA) to a first STA and a second STA which are multiple input multiple output (MIMO)-paired with an AP, the PSM information including a downlink transmission start offset indicating a time point at which a downlink transmission period starts, a downlink transmission duration indicating a duration of the downlink transmission period, and transmission destination STA identification information; and transmitting a data frame to the first STA and the second STA by using MIMO transmission during the downlink transmission period. The transmission destination STA identification information indicates a group identifier (ID) for indicating a destination STA group including the first STA and the second STA which are destinations of MIMO transmission performed by the AP.

The PSM information may further include uplink transmission start offset information indicating a time point at which the first STA can access radio media to transmit the data frame to the AP and first uplink transmission duration information indicating a duration in which the first STA can access the radio media from the time point.

Advantageous Effects

In a next generation wireless local area network (WLAN) system supporting multi user-multiple input multiple output (MU-MIMO) transmission, information for a power save mode (PSM) operation of a plurality of stations (STA) which are MIMO-paired with an access point (AP) is transmitted by inserting the information into a power save multi poll (PSMP) frame. As a result, downlink transmission can be performed by using a MU-MIMO transmission method even if the PSM operation is performed, an overall throughput of the WLAN system can be improved, and power of the STA can be effectively saved.

MODE FOR INVENTION

Figure 1:
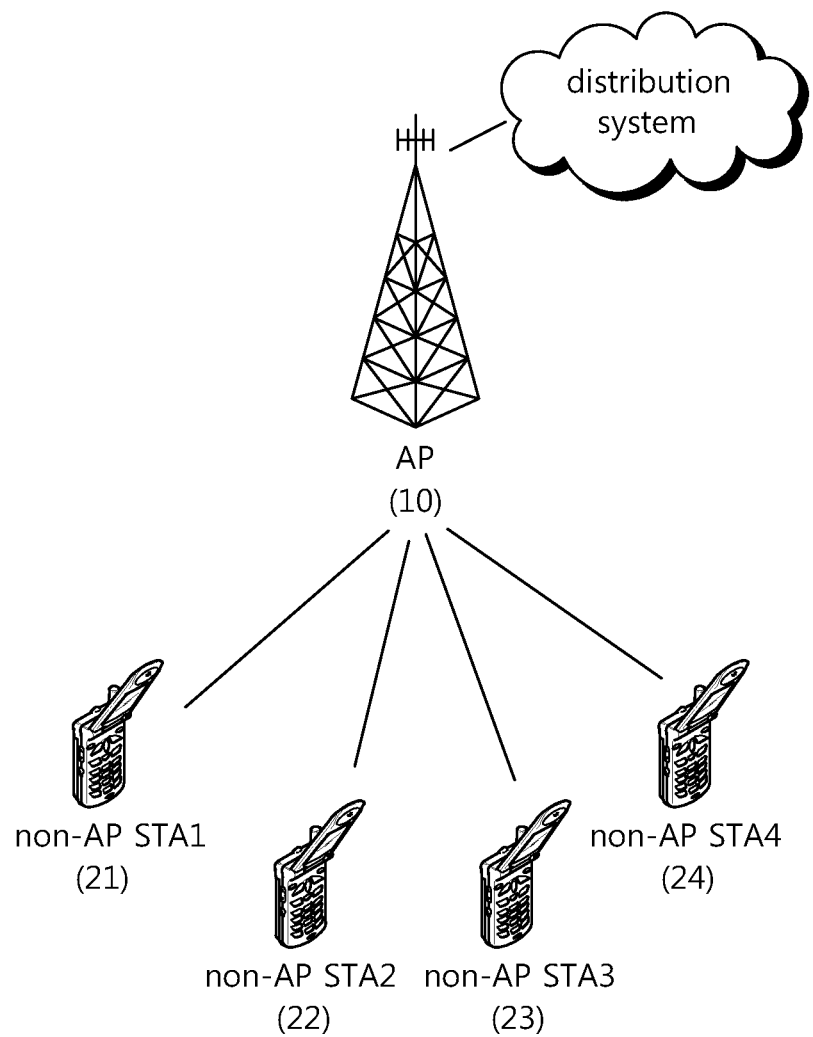
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area.

An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense.

The non-AP STA is an STA which is not an AP. The non-AP STA may also be referred to as other terms, such as a mobile terminal, a wireless transmit/receive unit (WTRU), a user equipment (UE), a mobile station (MS), a mobile subscriber unit, etc.

The AP is a functional entity for providing connection to the DS through a wireless medium for a non-AP STA associated with the AP. Although communication between non-AP STAs in an infrastructure BSS including the AP is performed via the AP in principle, direct communication is also possible between the non-AP STAs when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. STAs included in the ESS can communicate with each another. In the same ESS, a non-AP STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an STA senses a wireless channel or medium before starting transmission. As a result of sensing, if it is determined that the medium is in an idle status, frame transmission starts by using the medium. Otherwise, if it is sensed that the medium is in an occupied status, the STA does not start its transmission but sets and waits for a delay duration for medium access.

The CSMA/CA mechanism also includes virtual carrier sensing in addition to physical carrier sensing in which the STA directly senses the medium. The virtual carrier sensing is designed to compensate for a problem that can occur in medium access such as a hidden node problem. For the virtual carrier sensing, the MAC of the WLAN system uses a network allocation vector (NAV). The NAV is a value transmitted by an STA, currently using the medium or having a right to use the medium, to another STA to indicate a remaining time before the medium returns to an available state. Therefore, a value set to the NAV corresponds to a period reserved for the use of the medium by an STA transmitting a corresponding frame.

Meanwhile, a high throughput (HT) WLAN system conforming to the IEEE 802.11n standard specifies a PSM operation based on a power save multi poll (PSMP) protocol. In the operation based on the PSMP protocol, the AP respectively allocates a downlink transmission time (DTT) and an uplink transmission time (UTT) to each of non-AP STAs associated with the AP or non-AP STAs included in a specific group, and the non-AP STA transmits and/or receives a frame with respect to the AP only during the DTT and/or UTT allocated to the non-AP STA.

Figure 2:
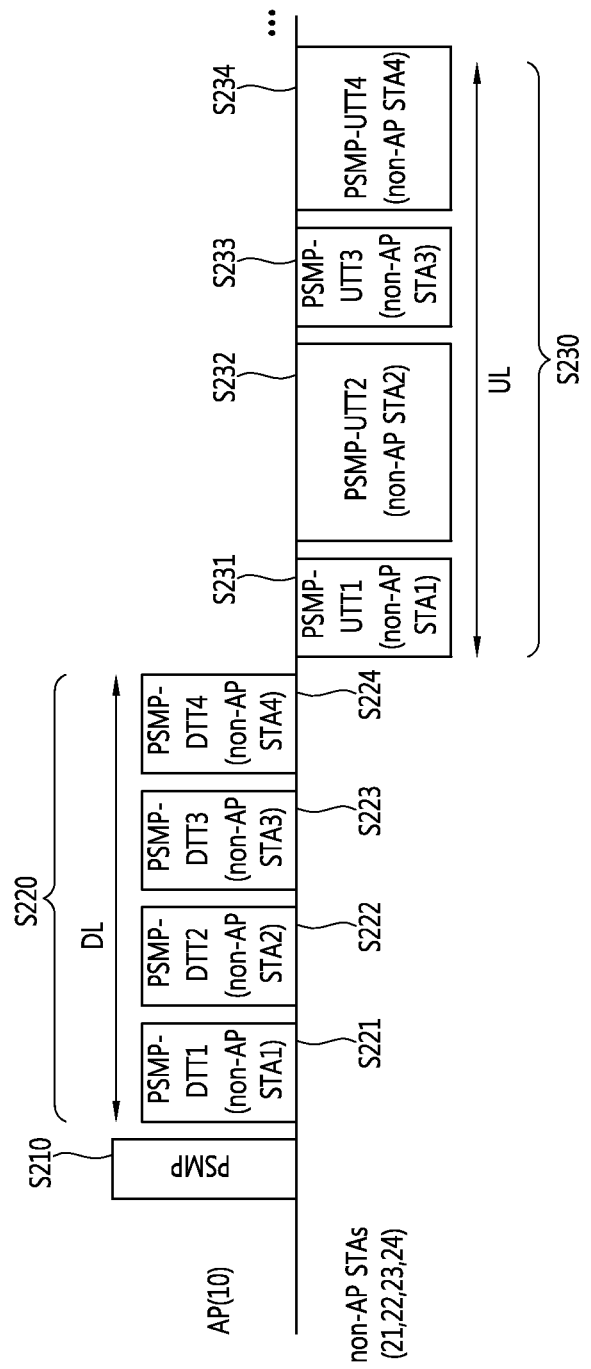
FIG. 2 shows an example of a PSM operation based on a PSMP.

FIG. 2 shows an example of a PSM operation based on a PSMP. In the example of FIG. 2, an AP 10 and four non-AP STAs 21, 22, 23, and 24 mutually transmit and receive frames. It is assumed that the AP 10 and the plurality of non-AP STAs 21, 22, 23, and 24 transmit and receive the frames by accessing wireless media on the basis of CSMA/CA.

Basically, in a WLAN system supporting the PSMP, the non-AP STA operates in an awake mode during a period in which the non-AP STA can access the wireless media, and operates in a sleep mode during a period in which the non-AP STA cannot access the wireless medium while other non-AP STAs can access the wireless medium.

The AP 10 transmits a PSMP frame to the plurality of non-AP STAs 21, 22, 23, and 24 so as to allocate a medium access period to the plurality of non-AP STAs 21, 22, 23, and 24 associated with the AP (step S210). The PSMP frame includes information indicating a period in which each non-AP STA receives the frame from the AP 10, that is, a downlink transmission time (DTT), and information indicating a period in which each non-AP STA transmits the frame to the AP 10, that is, an uplink transmission time (UTT). Therefore, the plurality of non-AP STAs receive the PSMP frame and can know respective time slots in which they can transmit or receive data.

When a PSMP-DTT is allocated to the plurality of non-AP STAs 21, 22, 23, and 24, the AP 10 can transmit a data frame to the non-AP STA during the PSMP-DTT with respect to each of the non-AP STAs 21, 22, 23, and 24. The AP 10 can transmit the data frame to the non-AP STA1 21 during a PSMP-DTT1 (step S221). The same is also applicable hereinafter to the non-AP STA2 22, the non-AP STA3 23, and the non-AP STA4 24 (steps S222, S223, and S224). The plurality of non-AP STAs 21, 22, 23, and 24 can transmit the data frame to the AP 10 during a PSMP-UTT allocated thereto. The non-AP STA1 21 can transmit the data frame to the AP 10 during a PSMP-UTT1 (step S231). The same is also applicable hereinafter to the non-AP STA2 22, the non-AP STA3 23, and the non-AP STA4 24 (steps S232, S233, and S234).

The non-AP STA1 21 can receive the data frame transmitted from the AP 10 during a time slot allocated as the PSMP-DTT1 (step S221), and can transmit the data frame to the AP 10 during a time slot allocated as the PSMP-UTT1. The PSMP-DTT2, DTT2, DTT3 and the PSMP-UTT2, UTT3, UTT4 are periods in which other non-AP STAs receive and/or transmit data frames, and since these periods can be known to the non-AP STA1 21 which receives the PSMP frame, the non-AP STA1 21 can transition to a sleep mode during these periods, thereby being able to achieve power saving. The same is also applicable to the non-AP STA2 22, the non-AP STA3 23, and the non-AP STA4 24.

Meanwhile, from the perspective of the AP 10, a possibility of incorrectly setting the PSMP DTT or of missing timing is low because an amount of data to be sent to each of the plurality of non-AP STAs 21, 22, 23, and 24 can be known. However, the AP 10 cannot correctly predict data that can be transmitted to the AP 10 from the non-AP STAs 21, 22, 23, and 24. As a result, a radio resource for a pre-set PSMP-UTT may be wasted. Returning to FIG. 2, there may be a case where the AP 10 expects to receive a data frame from the STA2 22 during a PSMP-UTT2, but the data frame is not transmitted. Since the PSMP-UTT2 is a period which has already been allocated to the STA2 22 by the AP 10 to transmit the data frame, the non-AP STA1 21, the non-AP STA3 23, and the non-AP STA4 24 have already transitioned to a sleep mode in that period. Therefore, there may be a problem in that the radio resource is wasted. This problem may also occur when some non-AP STAs fail to correctly receive a PSMP frame even if the PSMP frame is transmitted to non-AP STAs which are destinations of PSMP frame transmission. To compensate for this problem, a PSMP recovery frame can be used.

Figure 3:
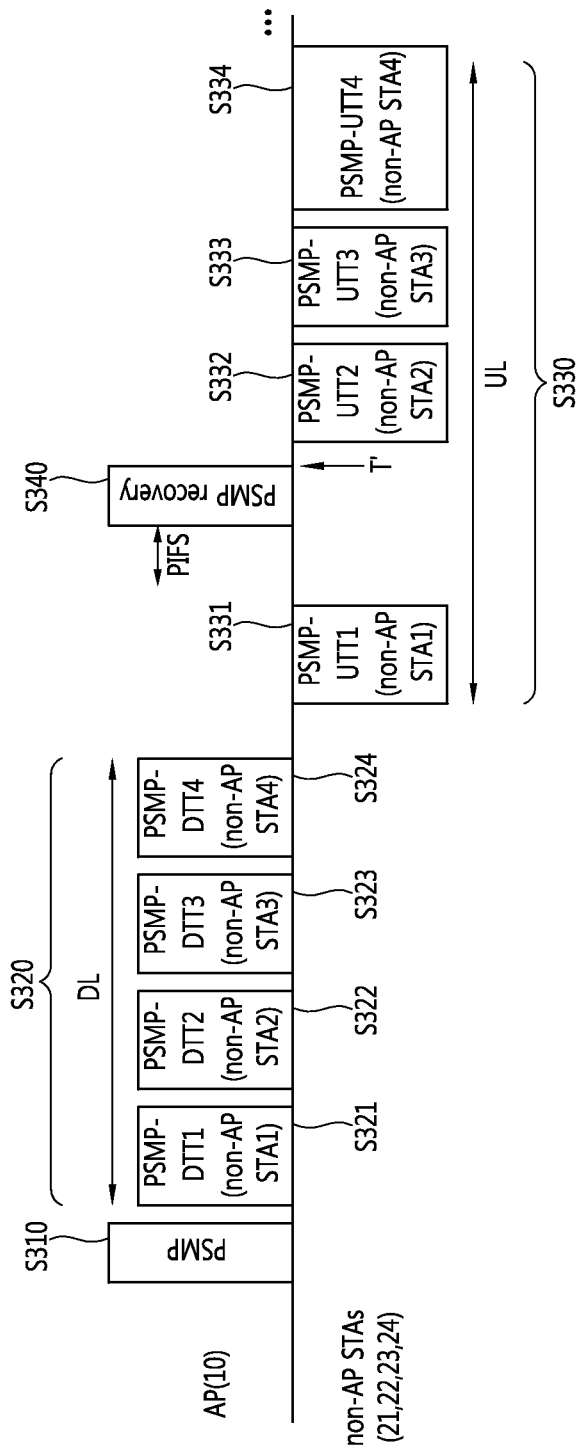
FIG. 3 shows another example of a PSM operation based on a PSMP.

FIG. 3 shows another example of a PSM operation based on a PSMP.

Referring to FIG. 3, an AP 10 transmits a PSMP frame to a plurality of non-AP STAs 21, 22, 23, and 24 (step S310), and transmits the data frame to the plurality of non-AP STAs 21, 22, 23, and 24 during respective PSMP-DTTs (step S320).

The STA1 21 transmits the data frame to the AP 10 during an allocated PSMP-UTT1 (step S321).

Thereafter, the STA2 22 does not transmit the data frame to the AP 10 during a specific period. In this case, the AP 10 transmits a PSMP recovery frame if no information is transmitted from the STA2 after waiting for PIFS in a PSMP-UTT2 (step S340). However, if the PSMP-UTT2 is shorter than a PIFS+PSMP recovery frame transmission period, the PSMP recovery frame may not be transmitted.

A frame format of the PSMP recovery frame may be the same as a format of the PSMP frame. However, the PSMP recovery frame includes information indicating a modified PSMP-UTT related to a non-AP STA of which a PSMP-UTT needs to be modified and includes information indicating a PSMP-UTT related to another STA to which the PSMP-UTT is previously allocated. In the example of FIG. 3, the PSMP recovery frame may include information indicating a modified PSMP-UTT2 for the non-AP STA2 22 and information indicating a PSMP-UTT3 for the non-AP STA3 23 and a PSMP-UTT4 for the non-AP STA4 24. Meanwhile, the PSMP-DTT and/or the PSMP-UTT may be determined as a start time point and duration of a corresponding DTT and UTT. Therefore, the PSMP recovery frame may further include PSMP-UTT offset information indicating a new time point at which the PSMP-UTT starts.

Upon receiving the PSMP recovery frame, the non-AP STA2 22 can transmit a data frame to the AP 10 during a newly allocated PSMP-UTT2 (step S322). Subsequently, the non-AP STA3 23 and the non-AP STA4 24 can transmit data frames to the AP 10 during the PSMP-UTT3 and the PSMP-UTT4, respectively (steps S323 and S324).

The PSMP frame is one type of action frame used in a WLAN system. Information included in a frame body may be as shown in Table 1 below. Details of the PSMP frame format may be found in the section 7.4.10.4 of IEEE 802.11n-2009 Part 11: Wireless LAN Medium Access Control (MAC) and Physical Layer (PHY) Specification, Amendment 5: Enhancements for Higher Throughput.

TABLE 1

| Order | Information |
| --- | --- |
| 1 | Category |
| 2 | Action |
| 3 | PSMP Parameter Set |
| 4 to (N_STA + 3) | PSMP STA information<br>It is repeated according to an N_STA subfield value (N_STA is a subfield of a PSMP parameter set) |

Referring to Table 1 above, a category field of the PSMP frame may be set to a value for indicating an HT. The action field may be set to a value for indicating that a corresponding frame is the PSMP frame.

A PSMP parameter set field is used to define the number of PSMP STA info fields included in the PSMP frame. That is, it can be used for the purpose of indicating whether a specific PSMP sequence is subsequently followed by another PSMP sequence and for the purpose of indicating a duration of the PSMP sequence. A PSMP parameter set may include an N_STA subfield including the number of non-AP STAs, a more PSMP subfield indicating whether there the PSMP sequence is subsequently followed by another PSMP sequence, and a PSMP sequence duration subfield indicating a PSMP sequence duration.

The PSMP STA info field includes information for a PSM operation based on the PSMP of FIG. 2 and information indicating a PSMP-DTT, a PSMP-UTT, corresponding non-AP STAs, etc. This field will be described in detail with reference to FIG. 4 and FIG. 5 below.

Figure 4:
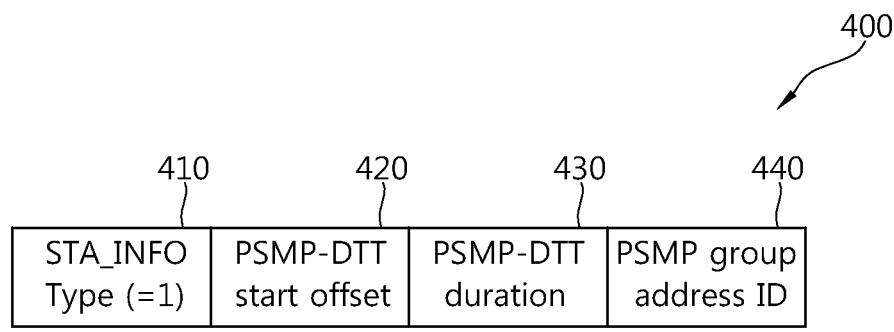
FIG. 4 is a diagram showing an example of a PSMP STA info field format.

FIG. 4 is a diagram showing an example of a PSMP STA info field format. The PSMP STA info field format of FIG. 4 is a format capable of allocating a PSMP-DTT for one or more non-AP STA groups.

Referring to FIG. 4, a PSMP STA info field 400 includes an STA_INFO type subfield 410 including information indicating a type of the PSMP STA info field 400, a PSMP-DTT start offset subfield 420 including information indicating a start time point of a PSMP-DTT, a PSMP-DTT duration subfield 430 including information indicating a PSMP-DTT duration, and a PSMP group address ID subfield 440 including information indicating a destination non-AP STA group for which a PSM operation is performed on the basis of information included in the PSMP STA info field 400.

The STA_INFO type subfield 410 indicates a specific information type corresponding to a format of the remaining subfields subsequent to the STA_INFO type subfield in a structure of the PSMP STA info field 400. The PSMP STA_INFO field of FIG. 4 includes PSMP-related information supporting a PSM operation of a non-AP STA group, and thus can be set to indicate the PSMP-related information, or can be set to "1" which is a value for indicating the PSMP-related information.

The PSMP-DTT start offset subfield 420 indicates a PSMP-DTT start time point. The time point can be set to a relative value for an end point of the PSMP frame.

The PSMP-DTT duration subfield 430 indicates a PSMP-DTT duration, and can be set to a relative value for an end point of a last PPDU including downlink data for a time point at which the PSMP-DTT start offset subfield 420 starts.

The PSMP group address ID subfield 440 can be set to indicate 43-bit least significant bits (LSBs) of a MAC address having a size of 48 bits.

Although the PSMP STA info field 400 of FIG. 4 includes information on a non-AP STA group, the PSMP STA info field can also be configured to include information on individual non-AP STAs. This will be described below with reference to FIG. 5.

Figure 5:
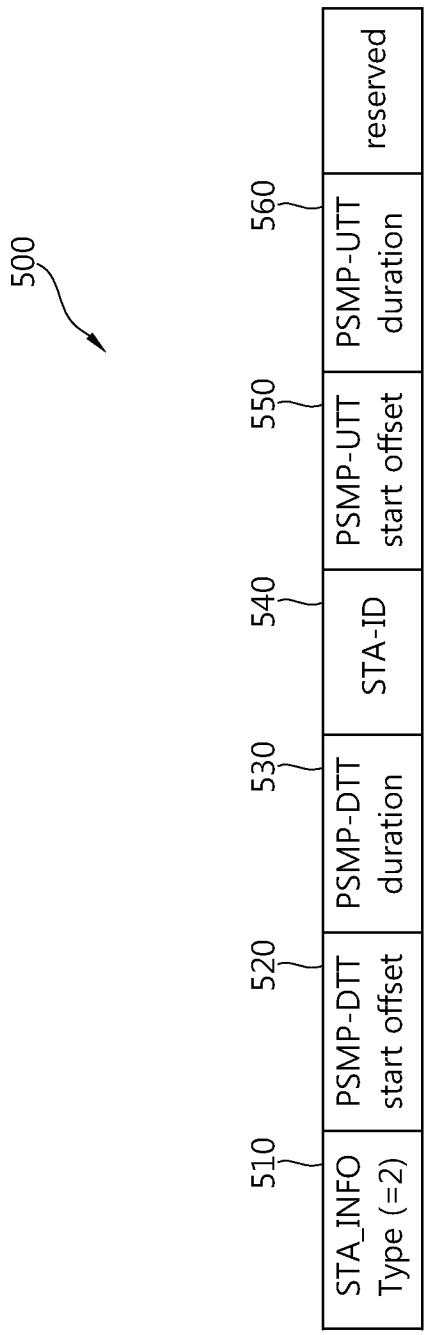
FIG. 5 is a diagram showing another example of a PSMP STA info field format.

FIG. 5 is a diagram showing another example of a PSMP STA info field format. The PSMP STA info field format is a format capable of allocating a PSMP-DTT and a PSMP-UTT to a specific non-AP STA.

Referring to FIG. 5, a PSMP STA info field 500 includes an STA_INFO type subfield 510 including information indicating a type of the PSMP STA info field 500, a PSMP-DTT start offset subfield 520 including information indicating a start time point of a PSMP-DTT, a PSMP-DTT duration subfield 530 including information indicating a PSMP-DTT duration, an STA-ID subfield 540 including information indicating a destination non-AP STA group for which a PSM operation is performed on the basis of information included in the PSMP STA info field 500, a PSMP-UTT start offset subfield 550 including information indicating a start time point of the PSMP-UTT, and a PSMP-UTT duration subfield 560 including information indicating a PSMP-UTT duration.

The STA_INFO type subfield 510 indicates a specific information type corresponding to a format of the remaining subfields subsequent to the STA_INFO type subfield in a structure of the PSMP STA info field 500. The PSMP STA_INFO field of FIG. 5 includes PSMP-related information supporting a PSM operation of a specific non-AP STA group, and thus can be set to indicate the PSMP-related information, or can be set to "2" which is a value for indicating the PSMP-related information.

The PSMP-DTT start offset subfield 520 indicates a PSMP-DTT start time point. The time point can be set to a relative value for an end point of the PSMP frame.

The PSMP-DTT duration subfield 530 indicates a PSMP-DTT duration, and can be set to a relative value for an end point of a last PPDU including downlink data for a time point at which the PSMP-DTT start offset subfield 520 starts.

The STA-ID subfield 540 includes information for identifying an STA which will perform a PSM operation according to the PSMP STA info field 500. This information may be an association ID (AID) which is allocated when the non-AP STA is associated with the AP.

The PSMP-UTT start offset subfield 550 indicates a start time point of the PSMP-UTT. The time point can be set to a relative value for an end point of the PSMP frame. A first PSMP-UTT can be configured to start when a time corresponding to short interframe space (SIFS) elapses from an time point at which the PSMP-DTT ends The PSMP-UTT duration subfield 560 indicates a PSMP-UTT duration, and can be configured to indicate a maximum length of the PSMP-UTT which can be allocated for a non-AP STA for performing uplink transmission.

Meanwhile, in order to introduce a DL MU-MIMO transmission technique, it is decided in a next-generation WLAN system to support a throughput of 1 Gbps in a frequency band less than 6 GHz. As a result, an AP can simultaneously transmit data to one or more non-AP STAs. In order to support a PSM operation based on a PSMP in addition to newly introduced MU-MIMO, the existing PSMP-based PSM operation method can be modified or added.

In the conventional HT WLAN system, the PSMP-based PSM operation is performed according to a PSMP frame including a PSMP STA info field. As described above, the PSMP STA info field has two types, i.e., a type in which a PSMP-DTT is allocated to an STA group and a type in which a PSMP-DTT and a PSMP-UTT are allocated to each non-AP STA.

First, the PSMP STA info field for setting the PSMP-DTT and the PSMP-UTT to each STA needs to be modified to cover a non-AP STA group which is a destination of MU-MIMO transmission in the next-generation WLAN system supporting MU-MIMO transmission.

Figure 6:
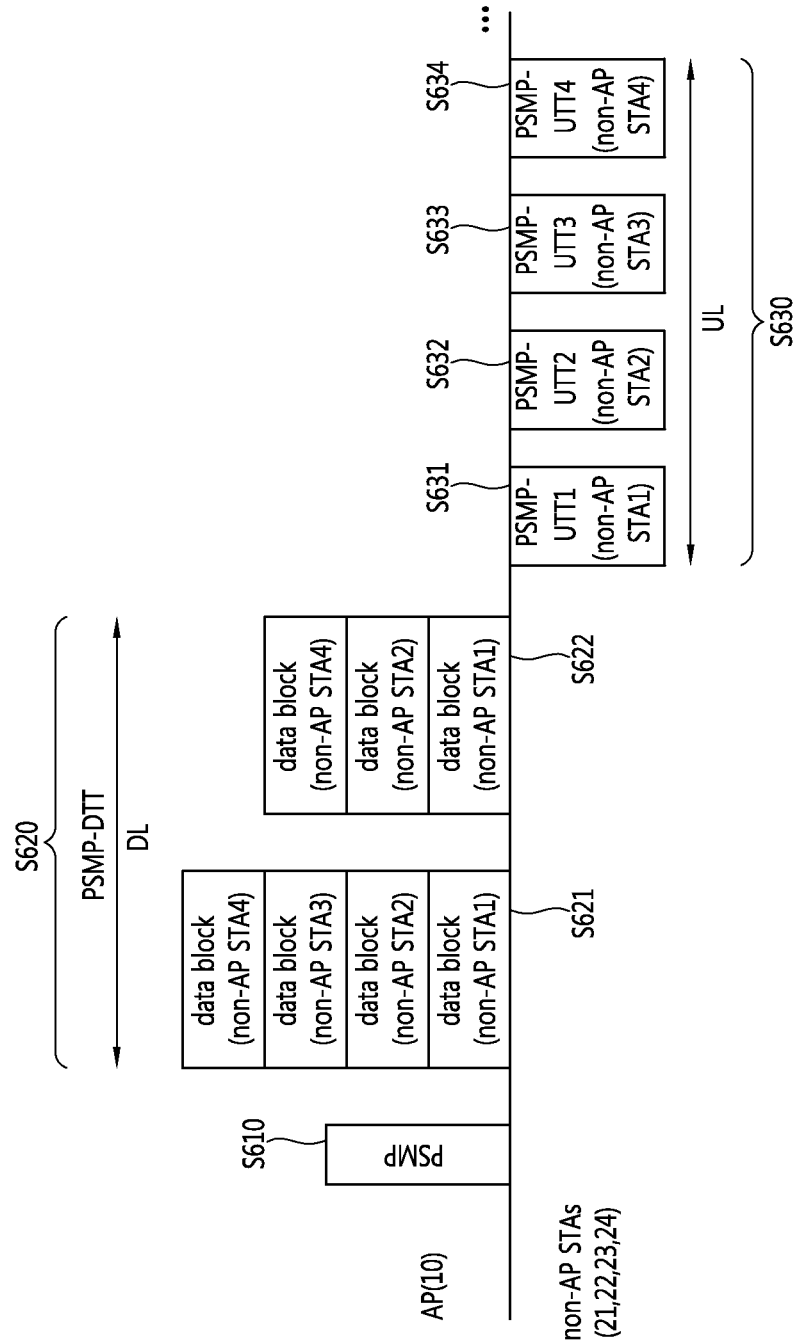
FIG. 6 shows an example of a PSM operation according to an embodiment of the present invention.

FIG. 6 shows an example of a PSM operation according to an embodiment of the present invention. It is assumed in FIG. 6 that a data frame can be transmitted to a plurality of non-AP STAs 21, 22, 23, and 24 by using a MIMO transmission scheme.

Referring to FIG. 6, an AP 10 transmits a PSMP frame to the plurality of non-AP STAs 21, 22, 23, and 24 in order to allocate a media access duration to the plurality of non-AP STAs 21, 22, 23, and 24 which are MIMO-paired with the AP (step S610). The PSMP frame includes information indicating a downlink transmission time in which the AP 10 can transmit a data frame to the non-AP STAs 21, 22, 23, and 24 and information indicating an uplink transmission time in which the AP 10 can transmit a data frame to the non-AP STAs 21, 22, 23, and 24. However, if a MU-MIMO transmission scheme is supported, the PSMP-DTT can be commonly allocated to the non-AP STAs 21, 22, 23, and 24. This is because the AP 10 can transmit a data frame simultaneously to the plurality of non-AP STAs.

If the PSMP-DTT is allocated to the non-AP STAs 21, 22, 23, and 24, the AP 10 can transmit the data frame to the non-AP STAs 21, 22, 23, and 24 by using the MU-MIMO transmission scheme. The AP 10 can transmit the data frame at least one or more times during the PSMP-DTT (steps S621 and S622). The data frame transmitted by the AP 10 can include at least one or more data blocks. Herein, the data block includes data which is intended to be transmitted to a specific non-AP STA. According to the MU-MIMO transmission scheme, the data block to be transmitted to the specific non-AP STA can be transmitted through at least one or more spatial streams. Referring to steps S621 and S622 in which the data frame is transmitted, the data frame transmitted in step S622 does not include the data block to be transmitted to a non-AP STA3. In this case, it means that there is no spatial stream to be allocated to the non-AP STA3.

When downlink transmission performed by the AP 10 ends during the PSMP-DTT, each non-AP STA transmits the data frame to the AP 10 during the allocated PSMP-UTT (step S630).

Meanwhile, in case of the WLAN system supporting the uplink MU-MIMO transmission scheme, the PSMP-UTT can be allocated simultaneously to the non-AP STAs, and similarly to the method of data frame transmission performed by the AP 10, a plurality of AP STAs can simultaneously transmit the data frame to the AP 10.

Figure 7:
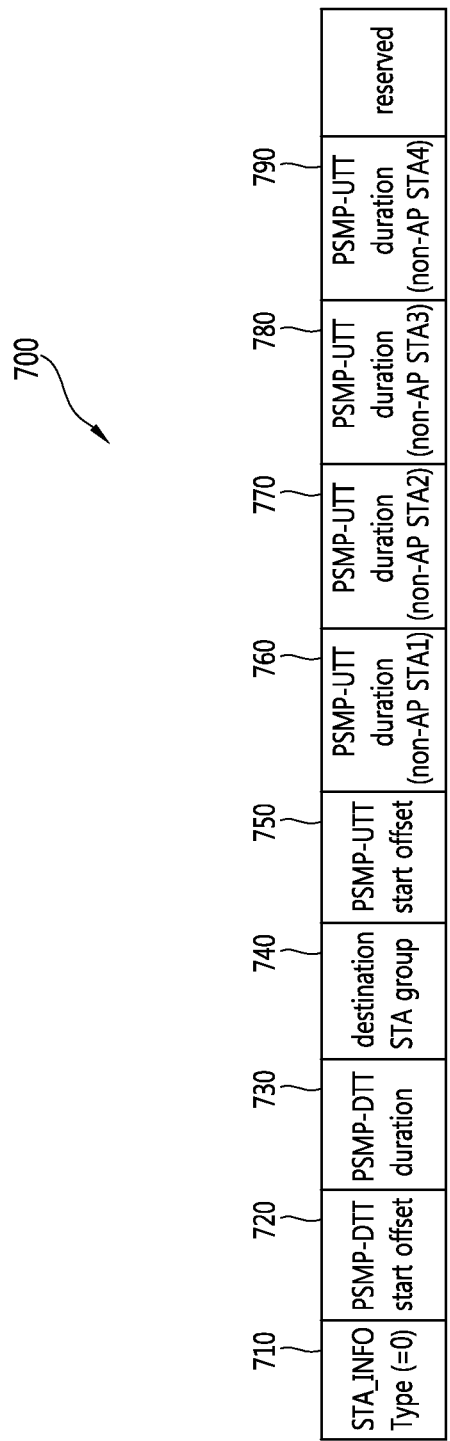
FIG. 7 is a diagram showing an example of a PSMP STA info field format according to an embodiment of the present invention.

FIG. 7 is a diagram showing an example of a PSMP STA info field format according to an embodiment of the present invention.

Referring to FIG. 7, a PSMP STA info field 700 includes an STA_INFO type subfield 710, a PSMP-DTT start offset subfield 720, a PSMP-DTT duration subfield 730, a destination STA group subfield 740, a PSMP-UTT start offset subfield 750, and a PSMP-UTT duration subfield 760.

The STA_INFO type subfield 710 indicates a specific information type corresponding to a format of the remaining subfields subsequent to the STA_INFO type subfield in a structure of the PSMP STA info field 700. The STA_INFO type subfield 710 of FIG. 7 is a newly introduced format to be applied to a next-generation WLAN system. Thus, a subfield value thereof can be set to a value capable of identifying that the PSMP STA info field 700 is a new format. For example, the subfield value can be set to indicate '0'.

The PSMP-DTT start offset subfield 720 indicates a PSMP-DTT start time point. The time point can be set to a relative value for an end point at which transmission of the PSMP frame ends.

The PSMP-DTT duration subfield 730 indicates a PSMP-DTT duration, and can be set to a relative value for a time point indicated by the PSMP-DTT start offset subfield 720 of a time point at which transmission of a last PPDU including downlink data ends.

The destination STA group subfield 740 receives the PSMP STA info field 700, and includes information indicating a plurality of non-AP STAs which will perform a PSM operation based on information included in the PSMP STA info field 700. The conventional PSMP STA info field 500 of FIG. 5 includes the STA ID subfield. This is because downlink transmission is supported by the AP and the non-AP STA in a one-to-one manner in a WLAN system not supporting MU-MIMO transmission. On the other hand, since the AP can perform downlink transmission simultaneously to a plurality of MIMO-paired non-AP STAs in the MU-MIMO WLAN system, PSMP-DTT and PSMP UTT-related information can be reported to the plurality of non-AP STAs through the PSMP frame. For this, the PSMP STA info field 700 may include information indicating the plurality of non-AP STAs which are MIMO-paired with the AP. When the AP transmits a data frame to the plurality of non-AP STA by using MU-MIMO, the information indicating the plurality of MIMO-paired non-AP STAs can be configured in a format of a group ID which is information indicating a transmission destination non-AP STA group. The group ID can indicate a transmission destination non-AP STA of a PPDU transmitted by the AP by using the MIMO transmission scheme, and more particularly, can indicate whether the MIMO transmission scheme is single user (SU)-MIMO or MU-MIMO. In case of the MU-MIMO, it can be configured to indicate the plurality of non-AP STAs.

Although it is assumed in FIG. 7 that the number of non-AP STAs 21, 22, 23, and 24 which are MIMO-paired with the AP 10 is 4 and a group ID can be set to indicate the four non-AP STAs 21, 22, 23, and 24, the number of paired non-AP STAs may not be limited thereto. Therefore, a format of a bit sequence constituting the group ID may vary.

Data which is intended to be transmitted by the AP 10 to each of the plurality of MIMO-paired non-AP STAs 21, 22, 23, and 24 may vary. However, since a data field including data is generated to have the same length for each non-AP STA through a padding process when generating a data frame to be transmitted by the AP 10, one PSMP-DTT subfield including information indicating a PSMP-DTT may be included in the PSMP STA info field 700. Therefore, upon receiving the PSMP frame, the plurality of non-AP STAs 21, 22, 23, and 24 can determine whether the PSMP STA info field 700 received through information indicated by the destination STA group subfield 740 is information for these non-AP STAs.

The PSMP-UTT start offset subfield 750 includes information indicating a start time point of a PSMP-UTT. In this case, the start time point of the PSMP-UTT implies a start time point of a PSMP-UTT at which a corresponding period first starts among a plurality of PSMP-UTTs allocated to each of the plurality of AP STAs 21, 22, 23, and 24 which are MIMO-paired with the AP 10.

The plurality of PSMP-UTT duration subfields 760 include information indicating a duration of each PSMP-UTT. Respective non-AP STAs which are destinations of MU-MIMO transmission cannot simultaneously transmit data in a WLAN system not supporting uplink MU-MIMO. Therefore, when a PSMP-UTT is allocated to each non-AP STA when transmitting a PSMP frame, the AP needs to allocate the PSMP-UTT individually to each non-AP STA so that uplink transmission can be performed during different periods. For this, a PSMP-UTT duration subfield for each non-AP STA can be included individually in the PSMP STA info field 700. The destination STA group subfield 740 includes information indicating the four MIMO-paired non-AP STAs, and thus the PSMP STA info field may include a non-AP STA1 subfield 761, a non-AP STA2 subfield 762, a non-AP STA3 subfield 763, and a non-AP STA4 subfield 764. As such, the number of PSMP-UTT subfields may vary depending on the number of paired non-AP STAs, which can be known by using information included in the destination STA group subfield. In addition, PSMP-UTT durations allocated to the respective non-AP STAs may be different from each other, and the non-AP STAs can transmit the same-length data during the allocated PSMP-UTT.

Second, the PSMP STA info field which allocates the PSMP-DTT for the non-AP STA group can be modified to be able to support MU-MIMO transmission. The PSMP STA info field 400 of FIG. 4 includes the PSMP group address ID subfield 440. The PSMP group address ID that can be included in the PSMP group address ID subfield may have the same structure as that of FIG. 8.

Figure 8:
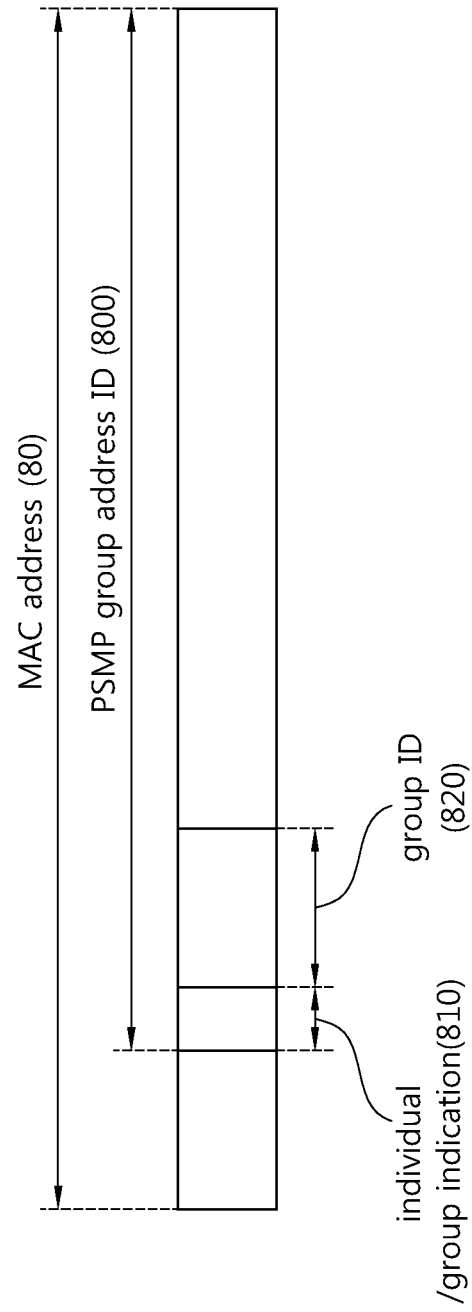
FIG. 8 shows a PSMP group address ID applicable to an embodiment of the present invention.

FIG. 8 shows a PSMP group address ID applicable to an embodiment of the present invention.

Referring to FIG. 8, a PSMP group address ID 800 consists of some bits of a bit-stream constituting a MAC address 80, and can be configured with LSB 43 bits. Among the LSB 43 bits, MSB one bit can be used as an individual/group indication subfield 810 for reporting whether a bit sequence consisting of some parts of a MAC address relates to individual information indicating a specific STA or relates to group information indicating a non-AP STA group. According to a value of the individual/group indication subfield 810, a subsequent bit-stream can be interpreted differently.

For example, when the individual/group indication subfield 810 indicates '1' in the next-generation WLAN system, it may imply that the PSMP group address ID 800 is included in the PSMP STA info field. If the AP transmits data to a plurality of non-AP STAs in a multicast or broadcast manner, at least one or more non-AP STAs which receive the PSMP frame transmitted by the AP may confirm a value indicated by the individual/group indication subfield 810 included in the PSMP STA info field and may be able to know that the PSMP STA info field includes the aforementioned information of FIG. 4, thereby being able to operate a PSM.

Unlike this, when the individual/group indication subfield 810 indicates '0', it may indicate that another piece of identification information is included in the PSMP STA information field instead of the PSMP group address ID. For example, it can be known that information indicating a group of a MU-MIMO transmission destination non-AP STA group is included. The information can be implemented in a format of a group ID 720. This can be interpreted as the same PSMP STA info field format of FIG. 9.

Figure 9:
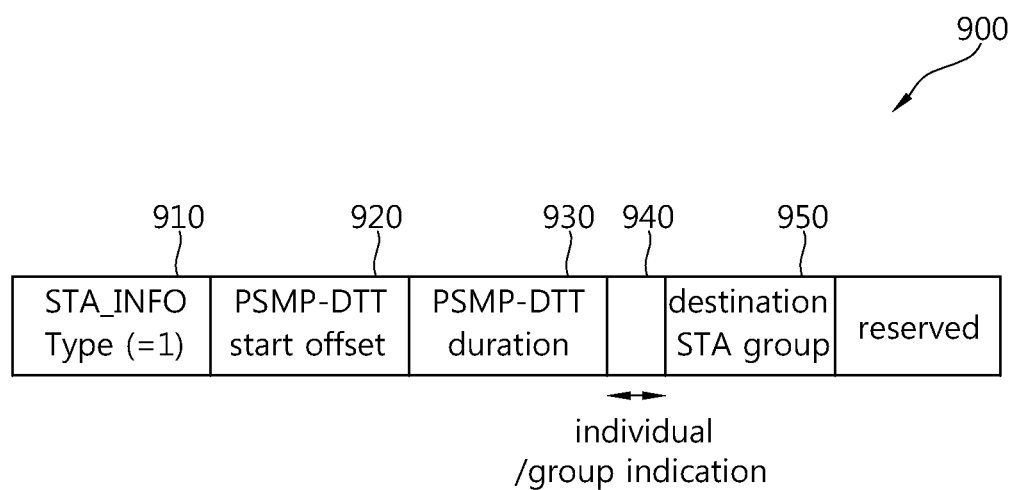
FIG. 9 is a diagram showing another example of a PSMP STA info field according to another embodiment of the present invention.

FIG. 9 is a diagram showing another example of a PSMP STA info field according to another embodiment of the present invention.

Referring to FIG. 9, a PSMP STA info field 900 includes an STA info type subfield 910, a PSMP-DTT start offset subfield 920, an PSMP-DTT duration subfield 930, an individual/group indication subfield 940, and a destination STA group subfield 950.

The STA info type subfield 910 indicates a specific information type corresponding to a format of the remaining subfields subsequent to the STA_INFO type subfield in a structure of the PSMP STA info field 900. Since the PSMP STA info field 900 of FIG. 9 includes information for allocating a PSMP-DTT to a plurality of MIMO-paired non-AP STAs, the STA info type subfield 910 can be set to "1" to indicate that it has the same structure as that of FIG. 4.

The PSMP-DTT start offset subfield 920 indicates a start time point of a PSMP-DTT. The time point can be set to a relative value for an end point at which transmission of the PSMP frame ends.

The PSMP-DTT duration subfield 930 indicates a PSMP-DTT duration, and can be set to a relative value for a time point indicated by the PSMP-DTT start offset subfield 920 of a time point at which transmission of a last PPDU including downlink data ends.

The individual/group indication subfield 940 may indicate that information included in a subsequent field which is set to '0' is information corresponding to a destination STA group subfield.

The destination STA group subfield 950 receives the PSMP frame, and includes information indicating a plurality of non-AP STAs which will perform a PSM operation based on information included in the PSMP frame. The information can be set to a group ID indicating a non-AP STA group for receiving a data frame from the AP 10 through a MU-MIMO transmission scheme.

The PSMP STA info field 900 of FIG. 9 is set to the same STA information type as the PSMP STA info field 400 of FIG. 4, but due to a value indicated by information included in the individual/group indication subfield 940, a subsequent subfield can be interpreted as a destination STA group subfield including information indicating a transmission destination non-AP STA group for receiving a data frame by using a MU-MIMO transmission scheme. However, since a bit length of the PSMP group address ID may be different from a bit length of the destination STA group subfield, a bit sequence subsequent to the destination STA group subfield may be reserved.

Meanwhile, in uplink transmission, the greater the number of MU-MIMO paired non-AP STAs, the shorter the PSMP-UTT allocated to each non-AP STA. Therefore, it may be unable to transmit a sufficient amount of data to the AP. In addition, if the PSMP-UTT is too short, a mechanism depending on a PSMP recovery frame is not normally activated, which may result in a high possibility of waste of radio resources. Therefore, the present invention proposes a separate PSMP STA info field for allocating the PSMP-UTT.

Figure 10:
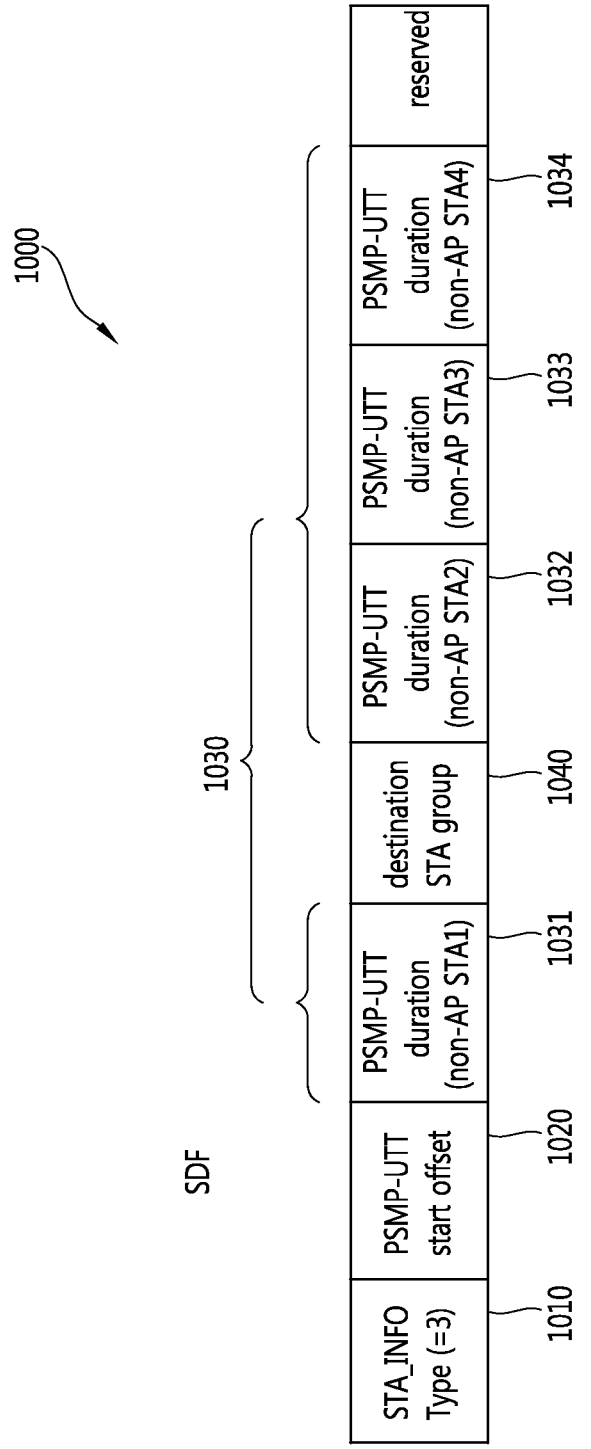
FIG. 10 is a diagram showing another example of a PSMP STA info field according to another embodiment of the present invention.

FIG. 10 is a diagram showing another example of a PSMP STA info field according to another embodiment of the present invention.

Referring to FIG. 10, a PSMP STA info field 1000 includes an STA info type subfield 1010, a PSMP-UTT start offset subfield 1020, at least one or more PSMP-UTT duration subfields 1030, and a destination STA group subfield 1040.

The STA info type subfield 1010 indicates a specific information type corresponding to a format of the remaining subfields subsequent to the STA_INFO type subfield in a structure of the PSMP STA info field 1000. Since the PSMP STA info field 1000 of FIG. 10 has a new format including information for allocating a PSMP-UTT to a plurality of MIMO-paired non-AP STAs, it may have a value '3'.

The PSMP-UTT start offset subfield 1020 includes information indicating a start time point of a PSMP-UTT. In this case, the start time point of the PSMP-UTT implies a start time point of a PSMP-UTT at which a corresponding period first starts among a plurality of PSMP-UTTs allocated to each of the plurality of AP STAs which are MIMO-paired with the AP.

The plurality of PSMP-UTT duration subfields 1030 include information indicating a duration of each PSMP-UTT. A PSMP-UTT duration subfield for each of MIMO-paired non-AP STAs can be included individually in the PSMP STA info field 1000. The number of PSMP STA duration subfields may be equal to the number of non-AP STAs indicated by the group ID included in the destination STA group subfield 1040.

Figure 11:
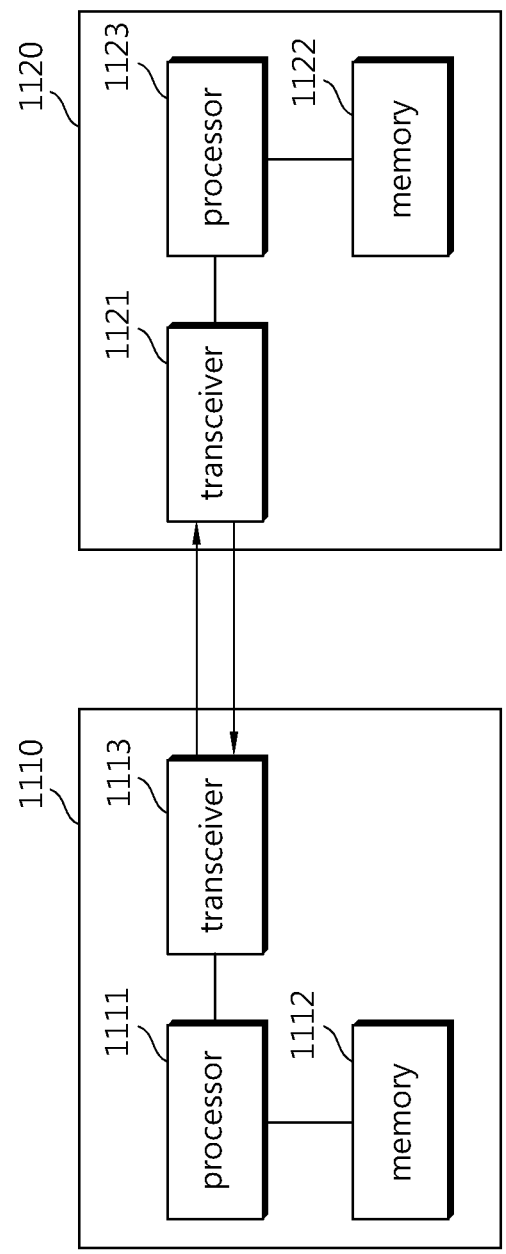
FIG. 11 is a block diagram showing a wireless apparatus for implementing an embodiment of the present invention.

FIG. 11 is a block diagram showing a wireless apparatus for implementing an embodiment of the present invention.

Referring to FIG. 11, wireless apparatuses 1110 and 1120 respectively include processors 1111 and 1121, memories 1112 and 1122, and transceivers 1131 and 1132. The transceivers 1131 and 1132 transmit and/or receive radio signals having a frame format, and implement an IEEE 802.11 PHY layer. The processors 1111 and 1121 are operatively coupled to the transceivers 1131 and 1132, and implement an IEEE 802.11 MAC layer and the PHY layer for performing a method of transmitting a PPDU delivered from the MAC layer. The wireless apparatuses 1110 and 1120 may be APs and/or non-AP STAs for implementing the aforementioned PSM operation method or may be apparatuses included therein. It is assumed hereinafter that the wireless apparatus 1110 is an apparatus included in the AP, and the wireless apparatus 1120 is an apparatus included in the non-AP STA.

The processor 1111 can be configured to implement operations performed by the AP according to the embodiments of the present invention described with reference to FIG. 6 to FIG. 10. The processor 1111 can be configured to generate a PSMP frame including PSM information, to transmit the frame to at least one or more MIMO-paired non-AP STAs in a format of a radio signal, and to transmit a data frame to the non-AP STA by using a MU-MIMO transmission scheme according to downlink transmission period information included in the PSM information. In addition, the processor 1111 can be configured to receive a data frame from at least one or more non-AP STAs according to uplink transmission period information included in the PSM information.

The processor 1112 can be configured to implement operations performed by the non-AP STA according to the embodiments of the present invention described with reference to FIG. 6 to FIG. 10. The processor 1112 can be configured to receive a PSMP frame including PSM information from the AP and to transition between an awake mode and a sleep mode on the basis of the PSM information. While operating in the awake mode, the processor 1112 can be configured to receive a data frame from the AP in a downlink transmission period and to transmit the data frame to the AP in an uplink transmission period.

The processors 1111 and 1121 and/or the transceivers 1131 and 1132 may include an application-specific integrated circuit (ASIC), a separate chipset, a logic circuit, and/or a data processing unit. The memories 1112 and 1122 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in memories 1112 and 1122 may be performed by the processors 1111 and 1121. The memories 1112 and 1122 may be located inside or outside the processors 1111 and 1121, and may be coupled to the processors 1111 and 1121 by using various well-known means.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

The invention claimed is:

1. A method for a wireless local area network, the method comprising:
receiving, by a station, station allocation information for indicating an uplink time and a downlink time from an access point, the station allocation information including an indication subfield, a type subfield, the indication subfield indicating whether any subfield for a multi-user (MU) group is included in the station allocation information, the type subfield indicating that the indication subfield is present,
wherein, if the indication subfield is set to a first value, the station allocation information further includes a group subfield and a start offset subfield, the group subfield indicating a group of stations for receiving a data frame from the AP through a multi-user multiple input multiple output (MU-MIMO) transmission scheme, the start offset subfield indicating a starting time to be accessed by the group of stations; and
when the station belongs to the group of stations, receiving, by the station, the data frame from the access point at the downlink time indicated by the station allocation information.

2. The method of claim 1, wherein, if the indication subfield is set to a second value, the station allocation information does not include the group subfield.

3. The method of claim 1, wherein the indication subfield has one bit.

4. The method of claim 1, wherein the group of stations indicated by the group subfield is operating in a power save mode.

5. A device for a wireless local area network, the device comprising:
 a transceiver configured to transmit and receive a radio signal; and
 a processor operatively coupled to the transceiver and configured to:
 instruct the transceiver to receive station allocation information for indicating an uplink time and a downlink time from an access point, the station allocation information including an indication subfield, a type subfield, the indication subfield indicating whether any subfield for a multi-user (MU) group is included in the station allocation information, the type subfield indicating that the indication subfield is present,
 wherein, if the indication subfield is set to a first value, the station allocation information further includes a group subfield and a start offset subfield, the group subfield indicating a group of stations for receiving a data frame from the AP through a multi-user multiple input multiple output (MU-MIMO) transmission scheme, the start offset subfield indicating a starting time to be accessed by the group of stations; and
 instruct the transceiver to receive the data frame from the access point at the downlink time indicated by the station allocation information when the device belongs to the group of stations.

6. The device of claim 5, wherein, if the indication subfield is set to a second value, the station allocation information does not include the group subfield.

7. The device of claim 5, wherein the indication subfield has one bit.

8. The device of claim 5, wherein the group of stations indicated by the group subfield is operating in a power save mode.

\* \* \* \* \*